Patented May 23, 1950

2,508,432

UNITED STATES PATENT OFFICE 2,508,432

BITUMEN-TREATING AGENT

Vaughn R. Smith, Berkeley, and Don E. Stevens, Fairfax, Calif., assignors to California Research Corporation, San Francisco, Calif., a corporation of Delaware No Drawing. Application September 6, 1949, Serial No. 114,285

16 Claims. (Cl. 106—273)

This invention relates to the preparation of compositions useful in the art of road-making, and is concerned more particularly with improving the bond between aggregate and bituminous materials. More specifically, the invention pertains to the preparation of bituminous compositions containing a polyamine salt of an organo-substituted acid of phosphorus, whereby the bond between a bituminous material and wet or dry aggregate may be made stronger, firmer, and more resistant to conditions tending to destroy said bond.

When employing a bituminous substance as a protective or binding material, a constant object sought in the art is the improvement of the adhesive bond between the bitumen and the material, such as aggregate, to be protected therewith or bound thereto. It is desirable to accomplish this object regardless of the type or nature of the material employed or the conditions to which the treated material may be subjected.

Polyamine salts of organo-substituted inorganic acids broadly are covered in our copending application Serial No. 77,061, filed February 17, 1949, which in turn is a continuation in part of our abandoned application Serial No. 708,181, filed November 6, 1946.

For example, in the construction of roadways, it is customary to apply bituminous paving materials to a suitable aggregate, reasonably available near the site of construction. Portions or all of this aggregate may be of a hydrophilic nature; that is, it is wetted by water in preference to oil. Before the ordinary bituminous paving material is applied to this type of aggregate, it is customary to dispel all of the moisture from the aggregate, otherwise a less satisfactory mix is obtained. However, even when the aggregate is dried and a good initial bond is obtained, the unavoidable contact of the bituminous-aggregate composition with normal surface water, rain water, and moisture present in the subgrade gradually bring about a breakdown of the aggregate-bituminous material bond. The aggregate is gradually wetted by the water, and the bituminous substance no longer holds the aggregate together, as a result of which a breakdown of the roadway occurs.

A number of substances, known as anti-stripping agents, have been proposed for the purpose of strengthening the bond between hydrophilic aggregate and bituminous substances. These substances are incorporated into the bituminous materials and/or the aggregate. However, many of these substances which are of considerable effect for this purpose are relatively expensive for use in the large quantities required in new roadway construction or in roadway repair work. Other substances which are more readily available for this purpose and are relatively inexpensive are nevertheless unsatisfactory for long-term use either because of the decomposition of the anti-stripping agent itself or the inability of the anti-stripping agent to prevent emulsification of water into the surface.

Thus, a constant object sought in the art is to provide an anti-stripping agent of maximum efficiency when used in low concentrations, that is, one capable of establishing a firm bond between all of the aggregate and the bitumen. Moreover, it is desirable that the anti-stripping agent be inexpensive, and that it may be used with different types of aggregate of widely varying chemical and physical properties.

Another important property sought in an anti-stripping agent is stability under adverse conditions of use. For example, it is common practice to maintain certain liquid asphalts (road oils) and asphaltic cements at temperatures which may range from about 200° F. to as high as 500° F. or higher to facilitate shipment and use thereof. It is therefore important that the anti-stripping agent be capable of withstanding the high temperatures of these materials when incorporated therein.

It is an object of this invention to provide a means of forming a lasting bond between bituminous substances and mineral aggregate.

It is a further object of this invention to provide bituminous compositions capable of adhering firmly to moist mineral aggregate.

It is still a further object of this invention to provide bituminous compositions which will continue to adhere firmly to mineral aggregate.

It is another object of this invention to provide a means of treating mineral aggregate so that a lasting bond may be obtained between bituminous substances and the treated mineral aggregate.

It is also an object of this invention to provide a relatively inexpensive means for providing a lasting bond between bituminous substances and mineral aggregate.

Still another object of the invention is to provide an anti-stripping agent effective, in small concentrations, to prevent stripping of bituminous substance from aggregate.

Yet another object of the invention is to provide an anti-stripping agent for use in paving mixtures, having superior properties of stability.

Other objects and advantages of the invention will be apparent from the ensuing description of the invention.

The present invention is based on the discovery that a polyamine salt of organo-substituted acids of phosphorus in combination with a mineral aggregate and a bituminous substance is capable of producing a highly effective bond between the aggregate and the bituminous substance.

In our copending application hereinabove referred to, we have disclosed polyamine salts of organo-substituted inorganic acids broadly as effective anti-stripping agents. We have now found that among the polyamine salts of organo-substituted inorganic acids, the polyamine salts of organo-substituted acids of phosphorus are outstanding. These salts, it has been found, may be used in lower concentrations with superior results, as a consequence of which they are considerably less expensive to use in paving mixtures. Moreover, we have found the aforesaid salts to be more effective with a wide variety of aggregate. Also, the polyamine salts of substituted acids of phosphorus have been found to retain their effectiveness when subjected to most severe conditions of use, and are particularly stable to the high temperatures often encountered in asphaltic mixtures.

The polyamine salts contemplated by the present invention are such as are formed by the reaction of an organo-substituted acid of phosphorus, hereinafter to be more fully described, and any organic compound containing at least two amino groups (—NH$_2$), two imino groups (=NH), or an amino and imino group, at least one of which groups is capable of forming salts with acidic substances.

Polyamines comprehended by the invention include polyamines referred to in the art as cationic surface active materials, as well as those polyamines considered to be surface inactive materials. Of these latter materials may be mentioned polyamines having at least two terminal amino groups, which because of the terminal groups are essentially hydrophilic and are ordinarily considered to be relatively cation surface inactive materials, for example, ethylene diamine; polyamines which, regardless of the position of the amino groups, have terminal carbon chains with fewer than 12 carbon atoms contained therein, that is, terminal chains having a carbon content below the minimum considered to be necessary in such chains in order to impart surface activity to the molecule, for example, 2,5-diamino dodecane; and substantially cation surface inactive polyalkylene polyamines, such as pentamethylene diamine. In general, polyamines included within the scope of the invention may vary from polyamines containing two or more carbon atoms to polyalkylene polyamines containing 60 or more carbon atoms. In carrying out the invention, any polyamine is suitable which when formed into a salt with the substituted acids of phosphorus, the salt may be dispersed in the bituminous material to form true solutions or mere stable dispersions of the salt in the bituminous material.

The organo-substituted acids of phosphorus contemplated by the invention are acid-reacting materials capable of forming a salt with the polyamines and include acids of trivalent and pentavalent phosphorus. In addition, the organo-substituted acids of phosphorus are such as contain at least two carbon atoms, and at least one ionizable hydrogen capable of reacting with the polyamines to form the salt. In general, these materials include compounds characterized by direct carbon-to-acid-forming element bonds, for example, a phosphonate or phosphinate; and compounds having the carbon and acid-forming element linked to an intermediate atom such as oxygen or sulfur, for example, a phosphate or thiophosphate.

More specific types of organo-substituted acids of phosphorus or phosphonous, phosphinous, and phosphonic and phosphinic acids; the mono- and di-esters of phosphoric acid; the mono-esters of phosphonous and phosphonic acids; various sulphur derivatives of the acids of phosphorus, such as mono-thiophosphonous acid, mono-thioester of phosphonous and phosphonic acids, etc.

The organic substituent of the inorganic acid may be alkyl groups, saturated, unsaturated, or substituted; alkaryl, aryl, aryl alkyl, heterocyclic, cyclic non-benzenoid radicals; and oxygen-containing radicals such as those in which the hydrogen of a hydroxyl group has been replaced by esterification, etherification, etc. The nature of these organic radicals is such that the salt of the polyamine and organo-substituted acids of phosphorus is soluble in the bituminous substance or, in the absence of the formation of a true solution, may be stably dispersed in the bituminous material.

Specific examples of the organo-substituted acids of phosphorus which may be employed in accordance with the invention are: ethyl, propyl, butyl, amyl, hexyl, and cetyl phosphonous and phosphonic acids; diethyl, dipropyl, dibutyl, diamyl, dihexyl, dicetyl, dodecyl, octadecyl, dodecyl phenyl, and tetradecyl phenyl phosphinous and phosphinic acids; partially esterified phosphorous acids, such as monoethyl, monopropyl, monobutyl, monoamyl, monododecyl, monotetradecyl, monocetyl, and mono-octadecyl esters of phosphorous acid; diethyl, dipropyl, dibutyl, dihexyl, didodecyl, ditetradecyl, dicetyl, dioctadecyl, and di-(cetylphenyl) esters of phosphorous acid; partially esterified phosphonous acids, such as ethyl, propyl, butyl, amyl, hexyl, dodecyl, cetyl, and octadecyl esters of ethyl phosphonous and phenylphosphonous acids; partially esterified acids of pentavalent phosphorus, such as ethyl, propyl, butyl, amyl, hexyl, mono-(hexylphenyl), monododecyl, monocetyl, and mono-octadecyl esters of phosphoric acid; and diethyl, dipropyl, dibutyl, dihexyl, didodecyl, ditetradecyl, dicetyl, dioctadecyl esters of phosphoric acids; partially esterified phosphonic acids, such as hexyl, octyl, decyl, dodecyl, tetradecyl, cetyl, and octadecyl esters of ethyl phosphonic acid, etc.

Particularly useful organo-substituted acids of phosphorus which may be employed as salt-forming elements in accordance with the invention are the organo-phosphorus compounds having a direct carbon-to-phosphorus linkage obtained in accordance with the process described in the copending Jensen and Clayton application, filed December 13, 1946, Serial No. 716,182. According to the aforesaid process, valuable organo-phosphorus compounds may be obtained by bubbling oxygen through a mixture of phosphorus trichloride and any of a large class of hydrocarbons, whereby a reaction mixture containing a phosphonyl chloride and phosphorus oxychloride is obtained. The phosphonyl chloride may be separated from the phosphorus oxychloride by distillation of the phosphorus oxychloride, whereupon the phosphonyl chloride may be converted to a phosphonate by hydrolysis. Among the hydrocarbons that may be used in the preparation of the phosphonate may be mentioned cycloaliphatic hydrocarbons, such as cyclohexane; aliphatic hydrocarbons, such as propane, butane, hexane, octane, dodecane, and octadecane; aromatic hydrocarbons substituted by aliphatic or cycloaliphatic radicals, such as toluene, and cyclohexyl-benzene; mixtures of hydrocarbons, such as gasoline, kerosene, mineral lubricating oil fractions, and paraffin wax, etc.

The method of incorporation of the polyamine salt contemplated by the invention in mixtures of aggregate and bituminous substance is not critical. Thus, a pre-formed salt of a polyamine and an organo-substituted acid of phosphorus may be added to the bituminous substance and/or to the aggregate prior to admixture of the two; or the salt may be formed in situ in either the aggregate or the bituminous substance or both; or the salt-forming elements of polyamine and acid may be added separately or combined in physical mixtures to either or both bituminous substance and aggregate, in which event it is believed that the salt product is formed upon the migration of the salt-forming elements to the interface of aggregate and bituminous substance. By "polyamine salt," therefore, it is intended to include the reaction product of the polyamine and organo-substituted acids of phosphorus, as well as mere physical mixtures of the two salt-forming elements.

According to a preferred embodiment of the invention, the salt is prepared prior to the incorporation thereof in the bituminous substance. The salt may be obtained by mixing the polyamine and acid, preferably in the presence of a diluent or solvent, at room temperature or at elevated temperatures to expedite admixture and reaction, but below decomposition temperatures of the reactants and of the final salt product. Upon completion of the reaction, the resulting product may be added as such or after removal of part or all of the diluent or solvent or in otherwise purified form, for example, the salt obtained after subjection of the reaction products to purification methods well known in the art, such as distillation or solvent extraction, etc.

In the preparation of the salt, the polyamine and the acidic substance need not be present in stoichiometric proportions, an excess of one or the other being permissible. In general, satisfactory materials have been prepared by employing a mol ratio of polyamine to organo-substituted acids of phosphorus varying from about 1:5 to about 5:1.

In practicing this invention, the polyamine salt of organo-substituted acids of phosphorus may be added to the bituminous substance before the latter is mixed with the aggregate or the aggregate may be separately treated with the polyamine salt. In the event the polyamine salt is mixed first with the bituminous substance, it is sufficient merely to mix the two together with such heating and agitation as may be necessary to produce a homogeneous blend. When the aggregate is separately treated with the polyamine salt, the latter may be mixed with the aggregate as such, or the polyamine salt may be dissolved in a solvent, for example, kerosene, before being mixed with the aggregate. It is also possible to mix the aggregate, the polyamine salt and the bituminous substance simultaneously.

In any case, the polyamine salt need be used in only small amounts. Amounts ranging from about 0.05 to about 10 per cent by weight, preferably 0.1 to 2 per cent, of the bituminous substance when the polyamine salt is added to the bituminous substance; or about 0.001 per cent to about 1 per cent, preferably 0.01 to about 0.5 per cent, of the aggregate, when the aggregate is treated separately with the polyamine salt.

The bituminous materials that may be employed in accordance with the invention are those employed in the construction and repair of roads, and are normally solid, semi-solid, or viscous liquids at ordinary atmospheric temperatures. Examples of suitable bituminous substances or bitumens are petroleum or native asphalt; pyrogenous distillates, such as oil-gas tar, coal tar; pyrogenous residues, such as blown asphalts, sludge asphalts, pressure tars, tar pitch; pyrobitumens, etc. In addition, mixtures of the foregoing materials, as well as mixtures or solutions of the aforesaid materials with solvents, such as naphtha, kerosene and stove oils, to give so-called liquid asphalts are also contemplated by the invention.

Of the foregoing materials, petroleum asphalt produced by steam-refining, by air-blowing, by solvent extraction methods, or by a combination of such methods, and having penetration values of about 30 to about 400 according to A. S. T. M. D5-25 method, is most advantageously used. Also, but less desirably, oil-in-water type emulsions of these and other bituminous materials may be used. Such emulsions can be prepared by methods well known in the art and the emulsions may be of the quick-breaking or penetration type or more stable type emulsions, such as slow-breaking or a mixing-type emulsion.

When the bituminous substance is present in the continuous phase, as in unemulsified asphalts, cut-backs and road oils, it is preferred to add the polyamine salt to the bituminous substance. When the bituminous substance is emulsified in water, the polyamine salt is preferably added to the aggregate.

The following examples illustrate the practice of the invention, but are not to be construed as limiting the invention thereto. In the examples, the parts are by weight, and film retention was determined according to a film-stripping test which was a modification of the standard Nicholson film-stripping test described in the "Proceedings of Asphalt Paving Technologist," January 1932, page 43. According to the test used, test samples of approximately 100 g. of the mixture of aggregate (limestone, silica, and rhyolite in the examples), bituminous substance and anti-stripping agent were allowed to cure in an oven at 140° F. for 24 hours. Following the curing period, about 50 g. of the cured mixture was placed in a flask partially filled with distilled water at 140° F. The flask was stoppered and placed in a frame which was rotated in a water bath at 140° F. After 15 minutes of rotation, the appearance of the mixture was reported in terms of estimated area that remained coated at the conclusion of the test. Conventionally, any aggregate retaining less than 70 per cent of film is considered to have failed.

*Example 1.*—The diethylene triamine salt of lauryl phosphoric acid was prepared by dissolving 5 parts of lauryl phosphoric acid in 6 parts of kerosene. To this mixture there was then added with stirring 1 part of diethylene triamine. Film retention results employing an MC-2 liquid asphalt containing the salt in an amount of 1 per cent were as follows:

| Limestone | Silica | Rhyolite |
|---|---|---|
| Percent 100 | Percent 90 | Percent 90 |

*Example 2.*—About 5 parts of hexadecyl phosphonic acid was dispersed in 10 parts of RC-3 asphalt, after which there was added 5 parts of ethylene diamine with stirring until complete dispersion was achieved. An RC-3 liquid asphalt containing 2 per cent of the final mixture gave the following film retention results:

| Limestone | Silica | Rhyolite |
|---|---|---|
| Percent 100 | Percent 100 | Percent 100 |

*Example 3.*—A polyamine salt of a phosphinic acid was prepared by adding 4 parts of dodecyl phosphinic acid to 2 parts of propylene diamine. Stirring and heating were continued until a uniform mixture was obtained. The product so obtained was added in an amount of 1% to SC-3 liquid asphalt heated to about 275° F. to prevent solidification of the additive. Stirring was continued until a uniform dispersion of the additive was effected. Film retention results were as follows:

| Limestone | Silica | Rhyolite |
|---|---|---|
| Percent 100 | Percent 100 | Percent 100 |

*Example 4.*—Five parts of myristyl phenyl thiophosphoric acid was mixed with vigorous stirring with 3 parts of a kerosyl polyamine obtained by chlorinating and then ammonolyzing the kerosene stock. The mixture was heated until stirring could be accomplished with ease, and stirring continued until complete homogeneity was obtained. At this point, 4 parts of kerosene was added slowly to the mixture until a fine slurry was obtained. About 2 per cent of the slurry was added to an asphalt cement of 85–100 penetration heated to approximately 350° F. Mixing of the two materials was continued until complete homogeneity was obtained. Film retention results obtained were:

| Limestone | Silica | Rhyolite |
|---|---|---|
| Percent 100 | Percent 100 | Percent 100 |

*Example 5.*—(a) A petroleum base oil used for the manufacture of hydraulic fluid (Specification AN-0-366) was treated with phosphorus trichloride and oxygen in the manner outlined in the Jensen and Clayton application hereinabove referred to. A crude hydraulic fluid phosphonic acid of approximately 20 per cent active acid content was obtained. Without separation from the unreacted base oil, the crude phosphonic acid was used as the acid ingredients in the preparation of the anti-stripping compound.

(b) About 33 g. of the crude phosphonic acid from (a) was mixed with 100 g. of kerosene cutter stock and 67 g. of ethylene diamine to form a heavily viscous to gel-like structure.

(c) About 2 g. of the hydraulic oil phosphonic acid-polyamine salt was added to 98 g. of MC-2 liquid asphalt with continued stirring, the product allowed to stand for 24 hours at 140° F., and then tested for film-stripping properties with the following results:

| Limestone | Silica | Rhyolite |
|---|---|---|
| Percent 90 | Percent 100 | Percent 100 |

*Example 6.*—Four grams of decamethylene diamine was combined with 96 g. of the hydraulic oil phosphonic acid obtained under (a) of Example 5. The resultant tarry fluid was mixed with MC-2 liquid asphalt at 250° F. in the proportion of 1 g. of the tarry fluid to 99 g. of the asphalt. Film-tripping results were as follows:

| Limestone | Silica | Rhyolite |
|---|---|---|
| Percent 100 | Percent 100 | Percent 100 |

*Example 7.*—About 17 g. of hexaethylene heptamine was added to 2900 g. of kerosene cutter stock. To this mixture there was added with vigorous stirring 83 g. of the hydraulic oil phosphonic acid obtained under (a) of Example 5. Six-gram portions of this kerosene solution were added to 100-gram samples of limestone, silica and rhyolite while stirring vigorously in each case. The samples were allowed to stand until drainage was substantially complete. The treated aggregate was then coated with an MC-2 liquid asphalt and tested for film-stripping properties according to the modified Nicholson test hereinabove described. The following results were obtained:

| Limestone | Silica | Rhyolite |
|---|---|---|
| Percent 100 | Percent 90 | Percent 90 |

*Example 8.*—About 33 g. of propylene diamine was added to 67 g. of cetyl phosphoric acid which had been heated until about one-half was completely fluid and the remaining portion, soft. At this point, heating was stopped and the propylene diamine was added with vigorous stirring. When the reaction mixture had started to drop in temperature, but prior to solidification, 200 g. of kerosene cutter stock was added slowly to form a light creamy textured paste. This paste was added with stirring to MC-2 liquid asphalt in an amount of 3 per cent. Film-stripping results were as follows:

| Limestone | Silica | Rhyolite |
|---|---|---|
| Percent 90 | Percent 100 | Percent 100 |

*Example 9.*—The salt of the surface active polyamine 1,3-diamino octadecane with cetyl phosphonic acid was prepared by dissolving about five parts by weight of cetyl phosphonic acid in six parts of kerosene. To this mixture there was then added with stirring about 4.5 parts of 1,3-diamino octadecane in 5 parts of kerosene. Film retention results with an MC-2 liquid asphalt containing the resultant salt in an amount of one per cent were as follows: Limestone, 95%; silica, 90%; rhyolite, 85%.

*Example 10.*—About five parts of hexadecyl phosphonic acid was dispersed in ten parts of RC-3 asphalt, after which there was added about four parts of surface-active 1,16-diamino hexadecane with stirring until complete dispersion was achieved. An RC-3 asphalt containing two per cent of the final mixture gave the following film retention: Results limestone, 90%; silica, 90%; rhyolite, 80%.

The following table illustrates the superiority in effectiveness of the polyamine salts of organo-substituted acids of phosphorus as compared with salts of other acids. In all cases, 1 part by weight of diethylene triamine (D. T.) was mixed with 2 parts of the indicated acid. The resulting mixture was then added to MC-2 road oil in a concentration of 0.25 per cent, and the anti-stripping qualities of each salt determined according to the modified Nicholson test hereinabove described.

TABLE I

*Polyamines (diethylene triamine)*

| Acid | Ratio: Acid/D. T. | Percent Conc. | Film Retention, percent | | | |
|---|---|---|---|---|---|---|
| | | | Limestone | Silica | Rhyolite | Average |
| Cetyl phosphonic acid | 2/1 | 0.25 | 90 | 90 | 90 | 90 |
| Do | 2/1 | 0.25 | 90 | 90 | 80 | 90− |
| Stearic Acid | 2/1 | 0.25 | 90 | 60 | 5 | 50+ |
| Cetyl phenol | 2/1 | 0.25 | 80 | 30 | 10 | 40 |
| Cresylic acids | 2/1 | 0.25 | 100 | 80 | 30 | 70 |
| Asphalt sulfonic acids | 2/1 | 0.25 | 90 | 90 | 10 | 60+ |
| Sulfate wood turpentine | 2/1 | 0.25 | 80 | 80 | 30 | 60+ |

From the foregoing table, it can be seen that of all the diethylene triamine salts employed, the diethylene triamine salts of cetyl phosphonic acid and of cetyl phosphoric acid give an average in film retention of about 90 per cent. While the diethylene triamine salt of cresylic acids gives an average of 70 per cent, yet its effectiveness is not as general as that of the salts of the organo-substituted acids of phosphorus. Similarly, some of the other salts are shown as being quite effective with some aggregates but very poor with others. The table thus illustrates the superior effectiveness of the salts of the substituted acids of phosphorus in that small concentrations of such salts may be used with good results over a wide variety of aggregates.

The salts herein contemplated need not be added to the bitumen and/or to the aggregate in pure form. For example, in the event a diluent, for example, kerosene, for any or both of the salt-forming reactants is employed, upon formation of the salt the diluent need not be removed from the reaction product prior to its use with the bitumen, sufficient amount of the diluted salt being used as to give the calculated desired amount of salt in the finished product.

Conversely, it is often advantageous to prepare the salts in concentrate form, and in this form incorporated into either bitumen or aggregate or both in the desired amounts. Such a procedure has the advantage of providing for more intimate admixture of the salt and the material to be treated. Concentrates of hydrocarbon oil, such as kerosene or naphtha, containing from about 15 per cent to as much as 50 per cent, by weight, of the salt are quite satisfactory. In addition to kerosene, other hydrocarbon diluents or solvents may be employed in the preparation of the concentrate. Such materials include mineral oils, lubricating oils and the like. Examples of other diluents are bituminous substances, such as the so-called liquid asphalts hereinabove mentioned.

This application is a continuation-in-part of our co-pending application Serial No. 77,062, filed February 17, 1949, which in turn is a continuation-in-part of our copending application Serial No. 708,181, filed November 6, 1946, both now abandoned.

Obviously, many modifications and variations of the invention as hereinbefore set forth may be made without departing from the spirit and scope thereof, and therefore only such limitations should be imposed as are indicated in the appended claims.

We claim:

1. A bituminous composition having superior anti-stripping properties consisting essentially of a bitumen normally possessing stripping tendencies and an amount sufficient substantially to lessen stripping of said bitumen of the salt of a polyamine and an organo-substituted acid of phosphorus having at least two carbon atoms, said carbon atoms being linked to said phosphorus through an intermediate atom.

2. A bituminous composition substantially as described in claim 1, wherein the phosphorus is pentavalent phosphorus.

3. A bituminous composition substantially as described in claim 1, wherein the intermediate atom is oxygen.

4. A bituminous composition substantially as described in claim 3, wherein the phosphorus is pentavalent phosphorus.

5. A bituminous composition having superior anti-stripping properties consisting essentially of a bitumen normally possessing stripping tendencies and, intimately dispersible therein, an amount sufficient substantially to lessen stripping of said bitumen of the salt of a polyamine and an organo-substituted acid of phosphorus having at least two carbon atoms.

6. A bituminous composition substantially as described in claim 5, wherein the polyamine is a polyalkylene polyamine.

7. A bituminous composition substantially as described in claim 5, wherein the bitumen is asphalt.

8. A bituminous composition substantially as described in claim 5, wherein the salt is present in an amount of about 0.05 to about 10% by weight of the bitumen.

9. A bituminous composition substantially as described in claim 5, wherein the salt is present in an amount of about 0.1 to about 2% by weight of the bitumen.

10. A bituminous composition substantially as described in claim 5, wherein the phosphorus is pentavalent phosphorus.

11. A bituminous composition substantially as described in claim 5, wherein the organo-substituted acid of phosphorus is characterized by a direct carbon-to-phosphorus bond.

12. A bituminous composition substantially as described in claim 11, wherein the phosphorus is pentavalent phosphorus, the bitumen is asphalt and the salt is present in an amount of about 0.05 to 10% by weight of the bitumen.

13. A bituminous road construction composition consisting essentially of, in intimate combination, a mineral aggregate, and a bituminous substance, said bituminous substance containing about 0.05 to 10%, by weight of the bituminous substance, of the salt of a polyamine and an organo-substituted acid of phosphorus.

14. A bituminous road construction composition substantially as described in claim 13, wherein the polyamine is a polyalkylene polyamine.

15. A bituminous road construction composition substantially as described in claim 13, wherein the bituminous substance is asphalt.

16. A bituminous road construction composition substantially as described in claim 13, wherein the organo-substituted acid of phosphorus is characterized by a direct carbon-to-phosphorus bond, the phosphorus is pentavalent and the bituminous substance is asphalt.

VAUGHN R. SMITH.
DON E. STEVENS.

No references cited.